United States Patent [19]

English

[11] Patent Number: 5,554,238

[45] Date of Patent: Sep. 10, 1996

[54] METHOD OF MAKING RESILIENT BATT

[75] Inventor: Brent W. English, Barneveld, Wis.

[73] Assignee: The United States of America as represented by the Secretary of Agriculture, Washington, D.C.

[21] Appl. No.: 364,358

[22] Filed: Dec. 27, 1994

Related U.S. Application Data

[62] Division of Ser. No. 155,253, Nov. 22, 1993, Pat. No. 5,418,031.

[51] Int. Cl.⁶ .............................. B32B 31/12; D04H 1/54
[52] U.S. Cl. .................... 156/62.2; 156/309.6; 156/324; 264/112; 264/122; 264/126
[58] Field of Search .................. 156/62.2, 276, 156/309.6, 324, 337; 264/112, 113, 119, 122, 126; 428/74, 283, 297, 318.8, 903, 907, 920

[56] References Cited

U.S. PATENT DOCUMENTS

| | | | |
|---|---|---|---|
| 2,543,101 | 2/1951 | Francis | 156/62.2 |
| 3,100,733 | 8/1963 | Bundy | 264/112 |
| 5,057,168 | 10/1991 | Muncrief | 156/62.6 |
| 5,188,896 | 2/1993 | Suh et al. | 428/397 |
| 5,318,644 | 6/1994 | McBride et al. | 156/62.2 |
| 5,456,872 | 10/1995 | Ahrweiler | 264/112 |
| 5,470,424 | 11/1995 | Isaac et al | 156/309.6 |

FOREIGN PATENT DOCUMENTS

| | | | |
|---|---|---|---|
| 2249138 | 4/1974 | Germany | 264/112 |
| 259819 | 9/1988 | Germany | 264/115 |
| 21515 | 2/1974 | Japan . | |
| WO/89/04886 | 6/1989 | WIPO | 156/296 |

*Primary Examiner*—Steven D. Maki
*Attorney, Agent, or Firm*—Janet I. Stockhausen; M. Howard Silverstein; John D. Fado

[57] ABSTRACT

Batt style insulation comprised of cellulosic and thermoplastic material and a method of making such insulation. A blend of cellulosic material and thermoplastic fibrous material, wherein the latter comprises between 3%–15% of the blend by weight, is formed by a method such as air-laying into a low density, high loft mat. The surface of the mat is flame-treated to melt the thermoplastic component on the surface, forming a skin which keeps the cellulosic component intact. The thermoplastic component in the interior of the mat remains unmelted, thereby providing the mat with a spring-back characteristic which allows the mat to retain most of its original shape and loft even after it has been compressed for shipping. A facing sheet can be applied to the surface of the mat, as is done with conventional fiberglass batt-style insulation.

11 Claims, 6 Drawing Sheets

5,554,238

1

METHOD OF MAKING RESILIENT BATT

This is a division of application 08/155,253 filed Nov. 22, 1993 now U.S. Pat. No. 5,418,031.

BACKGROUND OF THE INVENTION

The present invention pertains generally to the field of thermal insulation material, and more particularly to the field of thermal insulation having a cellulosic component.

The use of cellulosic particulates as thermally insulating material in contemporary construction is well-known. Such insulation takes the form of a free-flowing mixture of small cellulosic particles (about 1–10 mm in diameter) and short cellulosic fibers (about 0.5–3 mm in length), such as that shown in U.S. Pat. No. 4,579,592, wherein the particulates take the form of a low-density collection of cellulosic fibers and cellulosic particles (small chips or splinters). The insulation value arises from cells of trapped air interspersed between the cellulosic particulates; such cells are poor conductors of heat, and are of such a size that convective heat transfer is minimal. The cellulosic insulation is applied either wet or dry to the surface or cavity to be insulated. Smaller areas, such as residential attics, may be insulated by simply pouring the insulation onto the surface to be insulated. Larger areas are often insulated by using special equipment which blows the insulation onto a surface or into a cavity. The mixture may be wettened with an adhesive, allowing the mixture to stick to walls, ceilings, and other such surfaces where the dry mixture alone would not remain on the surface after application.

Cellulosic thermal insulation has several advantages over synthetic insulation materials. It may be made by processing cellulosic materials of either virgin or waste origin by shredding, hammer-milling, or otherwise processing them into a fibrous form. It is biodegradable and its manufacture does not involve the emission of environmentally harmful materials, as the manufacture of synthetic insulation materials often does; the manufacture of fiberglass insulation, for example, generally has the side effect of emitting formaldehyde into the environment. The cellulosic insulation may be rendered flame and / or vermin resistant by treatment with boric acid, mono- and diammonium phosphate, ammonium sulfate, zinc chloride, sodium tetraborate, or other appropriate substances.

However, free-flowing cellulosic insulation has several disadvantages. First, the most common method of application, blowing, requires special equipment. Second, when used in conjunction with adhesives for application to non-horizontal surfaces, application can be messy, time-consuming, and difficult. Third, removal of the mixture is difficult because of the granular (or, if used with an adhesive, foamlike) form of the fibrous mixture, requiring raking, vacuuming, or scraping for removal. All of these disadvantages can be avoided by use of a batt-style thermal insulator, one which may be affixed to the surfaces to be insulated by stapling, nailing, or otherwise attaching it to the surface. Such an insulator may be quickly applied without the use of any special equipment, and it may be quickly peeled away for easy removal or replacement. A batt-style cellulosic insulator would therefore hold several advantages over free-flowing cellulosic insulation that would make the use of cellulosic insulation more attractive when compared to synthetic materials.

As used in the specification and claims, "batt-style," "batt," or "batting" refers to a blanket-like product composed of loosely layered, non-woven material, as exemplified by fiberglass batt insulation.

Unfortunately, since the individual particulates of cellulosic insulation do not adhere to each other well, a method of forming them into an effective and sturdy batt has heretofore been unknown.

Cotton batts heretofore have been used as sound insulation ("cotton shoddy") underneath carpeting in automobiles and as pipe insulation, but such batts are not effective or sturdy enough for heat insulation in contemporary construction. These batts may have densities of about 200 kg/cubic meter which is too dense to provide effective heat insulation or adequate physical flexibility for contemporary construction.

The difficulty lies in finding a way to make the cellulosic particulates bind in such a way that the resulting batt is durable, but yet has the flexibility necessary for it to be folded or rolled for easy packaging and transportation. Further, the particulates must bind in such a way that the air cells interspersed between the fibers are preserved, if the insulation value of the cellulosic particulates is to be maintained. If the insulation cannot return to its low-density "fluffy" form, with cells of air interspersed between the insulation particulates, the insulating properties are largely lost.

One method of binding cellulosic particulates that is disclosed in the prior art is to mix the cellulosic particulates with thermoplastic particles and apply heat. The thermoplastic component then melts and encapsulates the cellulosic component, whose individual particulates then adhere to each other. Examples of such methods are disclosed in U.S. Pat. Nos. 5,082,605, 5,088,910 and 5,096,046. However, this method produces a product too rigid for easy packaging and transportation, and further does not preserve the insulative value of the cellulosic fibers due to the resulting high density of the product. Similar drawbacks arise from the use of an adhesive to bind the cellulosic fibers.

While the prior art reveals methods of binding cellulosic particulates to a flexible substrate material by the use of an adhesive, e.g. U.S. Pat. No. 4,634,621, such a method is not well-suited for the form of cellulosic particulates used for insulation; such particulates tend to become rigid and inflexible when an adhesive is applied.

Fiber reinforced composites have been manufactured utilizing either a single fiber type or a mixture of fibers to form a nonwoven air-laid batt which either includes thermoplastic fibers or is resinated with a thermoplastic material. This batt is then molded into a preform and maybe injected with resin (e.g. U.S. Pat. Nos. 4,663,225 and 4,812,283).

SUMMARY OF THE INVENTION

The present invention is directed to a batt-style thermal insulator, made of a combination of cellulosic particulates and thermoplastic fibers, which is durable and may be easily transported, applied, and removed while still retaining the advantages of free-flowing cellulosic insulation. The cellulosic particulates ordinarily are composed of cellulosic particles (about 1–10 mm in diameter) and short cellulosic fibers (about 0.5–3 mm in length). Such material typically is produced by comminuting recycled paper thereby resulting in approximately a 50/50 mixture (by weight) of particles and fibers.

The addition of a thermoplastic component to cellulosic insulation imparts a flexible, elastic characteristic to the insulation, allowing a batt made of these materials to spring back to near its original shape after it has been subjected to and released from an external force. In other words, the batt may be rolled up and confined in rolled-up form, but readily may return to its original shape upon removal of such confinement. This spring-back characteristic allows the batt to be compressed for shipping without fear that the compression will irreversibly flatten the batt and strip it of its insulating quality.

The thermoplastic fibers provide a matrix for the cellulosic particulates to allow the mixture to cohere to a greater extent than would cellulosic particulates alone, because the thermoplastic fibers entangle the cellulosic particulates as well as each other. Without the thermoplastic fiber matrix, the individual cellulosic particulates would fall apart.

The batt may be made more durable by heat treating the batt surface, which melts the thermoplastic component and forms a flexible "skin" which further holds the batt intact and lends it greater durability. Other than this heat treatment, the thermoplastic fibers in the batt of the present invention are not joined to one another except by entanglement.

The invention therefore retains the beneficial insulating properties and environmental advantages of cellulosic insulation while avoiding the need for special equipment for its transport, application, and removal.

The present invention involves a batt-style thermal insulator made of a mixture of cellulosic particulates and thermoplastic material. The cellulosic particulates may be prepared from any of the materials commonly employed to make cellulosic insulation, by any of the methods commonly employed to make it; the particulates used in the preferred embodiment are made from hammer-milled newspaper. The thermoplastic material may be polyethylene, polypropylene, vinyon, or other plastics, the only limitation being that thermoplastics with a melting temperature above 400 F. are not recommended if the batt is to be heat treated because the cellulosic particulates begin to decompose above this temperature. The preferred embodiment uses thermoplastic fibers made of low density polyethylene (LDPE), the material which presently forms most modern-day plastic film (e.g. garbage bags and peel-off container lids).

To form the invention, thermoplastic fibers of 1–6 denier which are 2–15 centimeters in length are mixed with cellulosic insulation material so that the thermoplastic component forms approximately 3%–15% of the mixture by weight. Mixtures within this range have been tested with positive results. Rather than using solid thermoplastic fibers, specially manufactured hollow thermoplastic fibers may be used in order to increase the insulating properties of the finished invention. The mixture then is formed into a low density batt (about 10–40 kg/cubic meter) of high loft by a method such as air-laying, the method used in the preferred embodiment. Examples of air-laying are given in U.S. Pat. Nos. 3,895,088 and 3,963,391.

While the resulting batt is more durable than any similar batt that could be made of cellulosic material alone due to the entanglement caused by the thermoplastic fibers, such a batt is still not as strong as a synthetic insulating batt and cannot withstand extensive handling. The batt can be made more durable by applying heat to the outer surfaces of the batt, melting the thermoplastic fiber on the surfaces and forming a porous "skin" on the surfaces which imparts greater strength to the batt. Strength is also imparted due to the action of thermoplastic fibers which happen to extend from one surface to the other; these form columns which are bonded to the skins and that hold the skins together. These same fibers also help to impart the spring-back characteristic to the batt that pushes the skins apart. The invention as described has been heat-treated by passing the batt under an electric heater so that the surfaces and edges of the batt reach approximately 350 F. Heat treatment may also be achieved by rolling the batt through calendar rolls containing internal resistance heaters, but this method compresses the batt during heating and therefore produces a batt with less loft and less insulation value.

The skin renders transportation and installation of the insulation far easier than they would be for ordinary cellulosic insulation. The skin insures that all of the cellulosic particulates remain within the batt during subsequent handling, whereas a non-heat-treated, "skinless" batt would lose some of its cellulosic component. The batt may be rolled into bundles, as is done for fiberglass batt insulation. The elastic properties of the unmelted thermoplastic within the interior of the batt act as a spring, returning the batt to near its original shape even after it has been compressed during the shipping process. The batt may be stapled or otherwise affixed to the surface to be insulated.

Batt-style insulation often includes some kind of facing sheet over one or more of its surfaces, and the insulating batt herein disclosed may use a facing sheet as well. The facing sheet's ends may extend beyond the surface of the insulation so that the facing sheet may be nailed or stapled to a surface, rather than driving the fasteners through the batt, thereby allowing the use of shorter fasteners and promoting easier installation. The facing sheet may also be used to modify the insulating (or other) properties of the batt. One common facing sheet for batt-style insulation is kraft paper affixed to the batt by asphalt spray; the asphalt spray hinders moisture travel through the insulation and serves as a vapor barrier. Another common facing sheet is thin foil, which reduces radiative heat transfer from the surface of the insulation. Any of these features are attractive possibilities for use in combination with the batt herein disclosed.

The invention may be rendered fire-resistant either by using treated fibers as the raw ingredients for the batt, or by using untreated fibers and treating the finished batt. Similar steps can be taken to render the invention vermin-resistant.

Further objects, features, and advantages of the invention will be apparent from the following detailed description when taken in conjunction with the accompanying drawings.

DETAILED DESCRIPTION OF THE INVENTION

Figure 1:
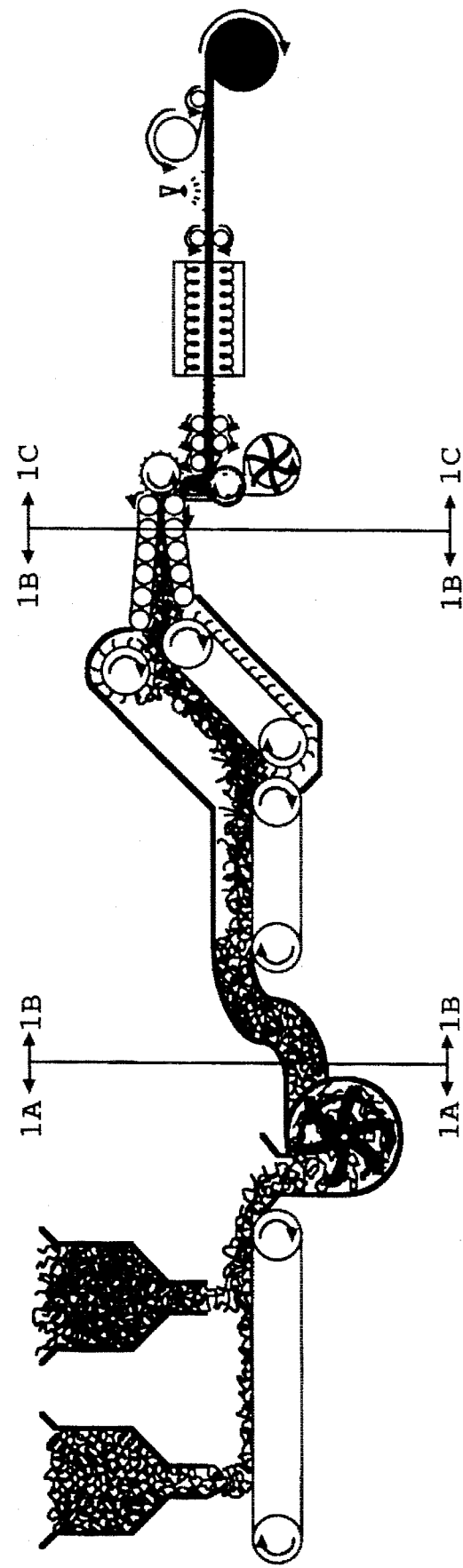
FIG. 1 is a view of an embodiment of an apparatus for making the insulation.

An apparatus for making the insulation is shown in its entirety in FIG. 1. The components of the apparatus of FIG.

Figure 1A:
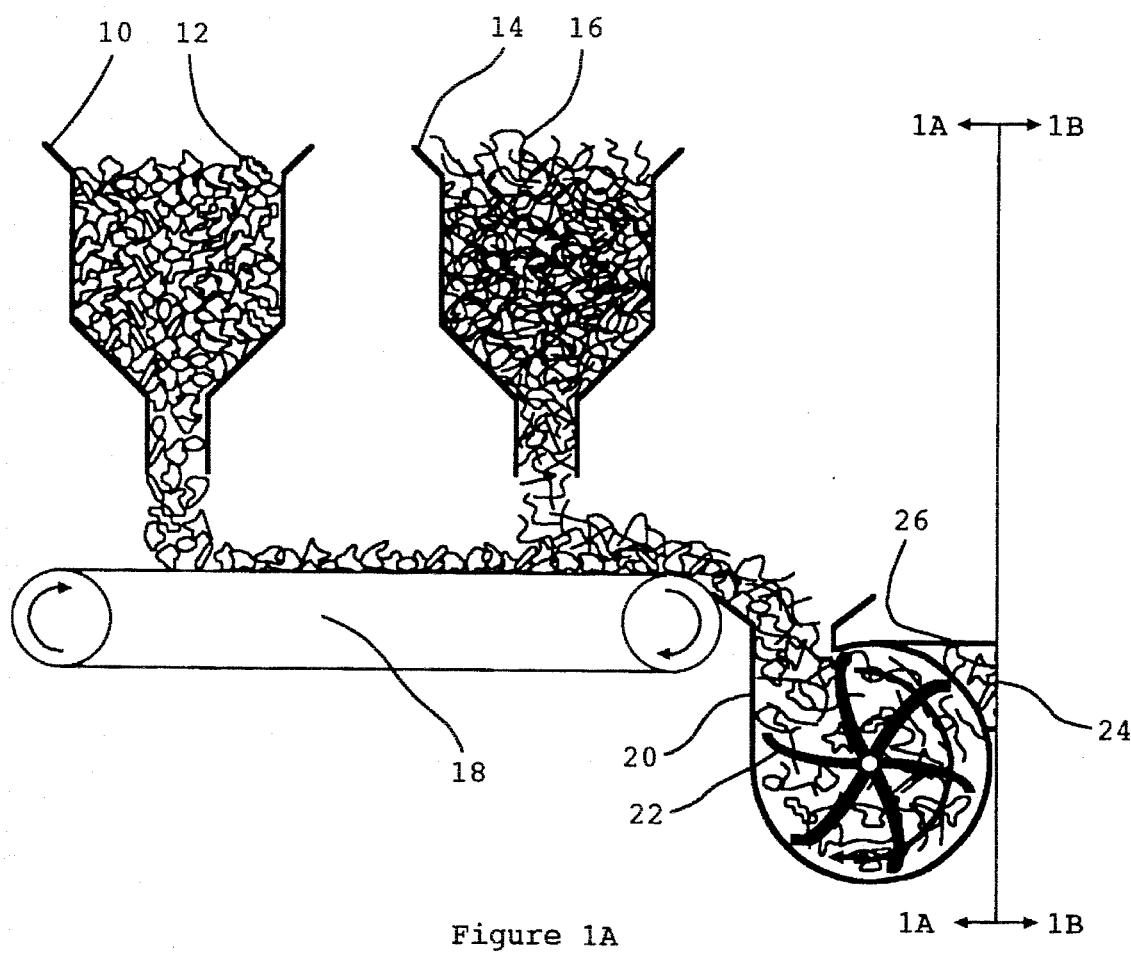
FIG. 1A is a view of the loading and mixing stage of the apparatus for making the insulation.
Figure 1B:
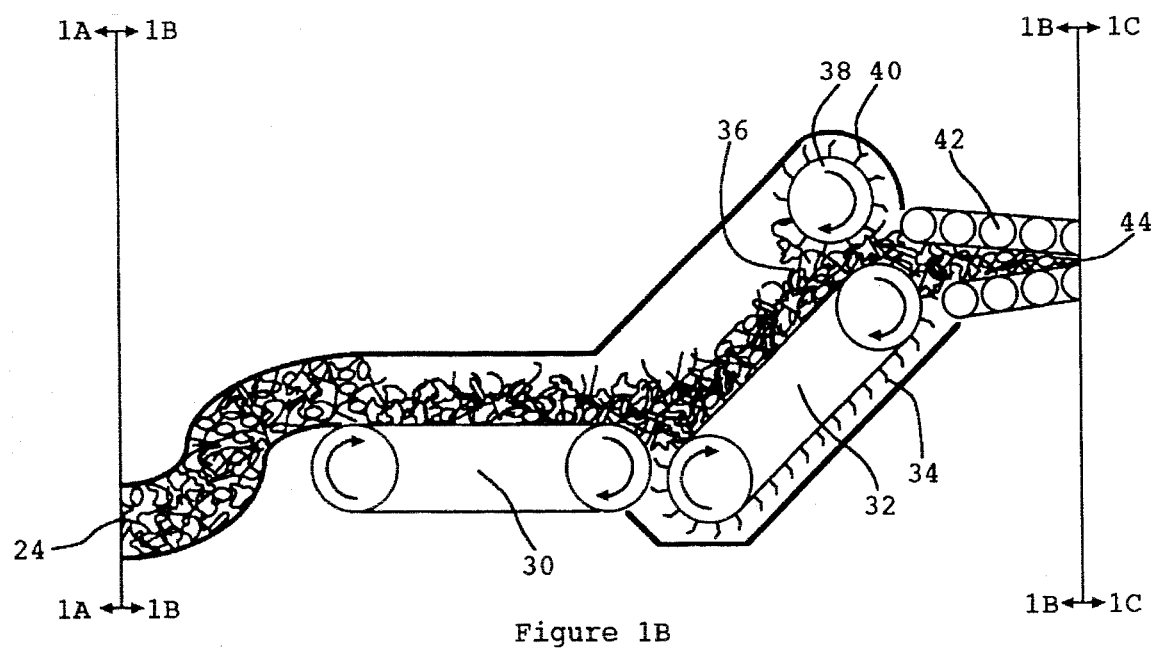
FIG. 1B is a view of the metering and processing stage of the apparatus for making the insulation.
Figure 1C:
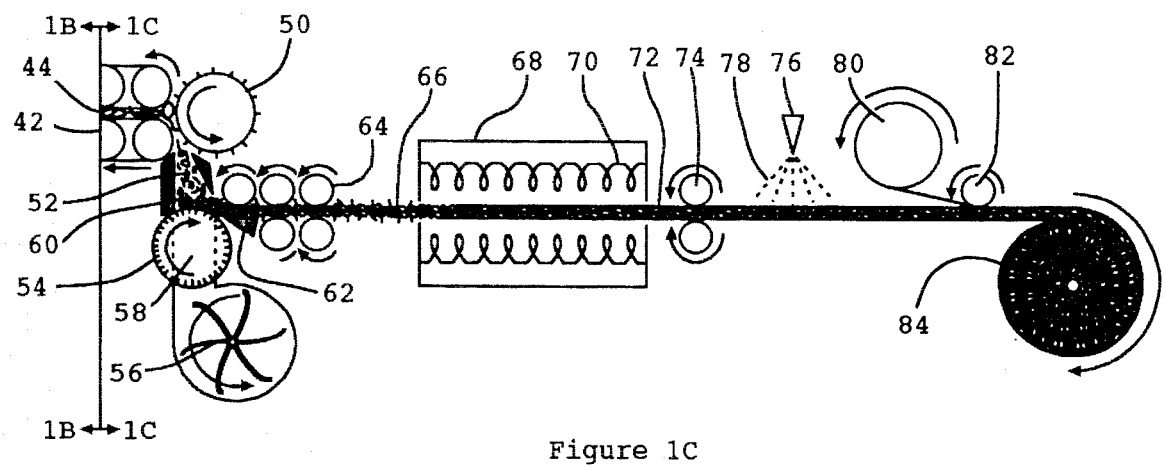
FIG. 1C is a view of the batt-making and heating stage of the apparatus for making the insulation.

1 are divided into three parts, each of which is shown in FIGS. 1A, 1B, and 1C.

FIG. 1A shows hopper 10, containing cellulosic particulates 12, and hopper 14, containing thermoplastic fibers 16. The cellulosic particulates 12 are made of hammer-milled newspaper. The thermoplastic fibers 16 are low density polyethylene (LDPE) fibers of 1–6 denier and 2–15 centimeters in length. Both types of fiber may tangle into clumps, so some means of de-clumping the fibers may be necessary at a later stage of processing. The hoppers 10 and 14 have a metering mechanism which only releases 3%–15% thermoplastic fibers for every unit of weight of cellulosic particulate released, thereby insuring a proper component ratio for the finished batt. While an insulating batt with less than 3% or greater than 15% thermoplastic component by weight is likely possible, such an insulating batt has not yet been produced and tested.

The cellulosic particulates 12 and thermoplastic fibers 16 are carried unmixed by conveyor 18 into a mixing chamber 20. Here a fan 22 produces a high-speed swirl of air within the chamber which thoroughly mixes the cellulosic particulates 12 and thermoplastic fibers 16. The mixed components 24 are blown by the fan 22 out of the mixing chamber 20 into a closed duct 26, which carries the mixture 24 to the next stage in processing, shown in FIG. 1B.

FIG. 1B shows the closed duct 26 transferring the mixture 24 to conveyor 30, which in turn transfers the mixture 24 to conveyor 32. The belt of conveyor 32 has scoops 34 to assist the conveyor 32 in carrying the mixture 24 up its incline. At the top of the incline lies the metering passage 36, where part of the mixture 24 is skimmed off to insure that a uniform flow of the mixture 24 enters the next stage of processing. The metering wheel 38 has scoops 40 which have very little clearance over the scoops 34 on the conveyor 32, so any amount of mixture 24 extending over the top of the scoops 34 will be taken off by the scoops 40. After the metered mixture 44 leaves the metering passage 36, it is pulled by the conveyors 42 into the next stage of processing, shown in FIG. 1C.

FIG. 1C shows the final stage of processing. The conveyors 42 pull the metered mixture 44 into the lickerin 50, whose sharp teeth pull apart any clumps of fiber that the metered mixture 44 may have formed; the de-clumped mixture is shown at 52. The lickerin 50 throws the de-clumped mixture 52 into an air-laying apparatus so that the fibers may be formed into a batt. The air-laying apparatus basically consists of a rotating perforated drum 54 and a fan 56. The fan 56 pulls air away from the lickerin 50 and through the perforated drum 54 by way of an air passage 58, pulling the de-clumped mixture 52 tightly against the perforated drum 54. The fibers thereby lay over each other and tangle, forming a batt 60. After the perforated drum 54 rotates the batt 60 so that it no longer lays over air passage 58, the batt 60 is no longer being pulled onto the perforated drum 54, allowing its separation from the perforated drum 54 by the wedge 62. The batt 60 is then guided out of the air-laying apparatus by rollers 64, and it is shown in its finished state at 66. The batt 66 may then be heat-treated if desired; a heat-treated batt has durability superior to a batt which is not heat treated.

If the batt is to be heat-treated, the rollers 64 guide the batt 66 into the heating chamber 68. The heating chamber 68 contains electrical heating elements 70 which maintain the interior of the heating chamber 68 at approximately 350 F. An open-flame method of heating, such as exposed burning gas jets, is also acceptable. The size of the heating chamber 68 and the speed of the batt's passage must be such that the thermoplastic fibers at the surface of the batt 66 have time to melt and form a skin. If the batt 66 is subjected to heat for too long, the fibers on the interior of the batt 66 will melt, decreasing its loft and hence its insulating value. The heat-treated batt, in essentially its finished form, emerges with a skin at 72 as it is pulled from the heating chamber 68 by take-up rollers 74. A sprayer 76 may then spray the batt 72 with a coat of asphalt over one of the batt's faces; the asphalt serves as both a vapor barrier and an adhesive. A roll of facing sheet 80 can then be applied to the sticky face of the batt 72 by the roller 82. The final batt, with facing sheet applied, can then be wound into a roll at 84.

Figure 2:
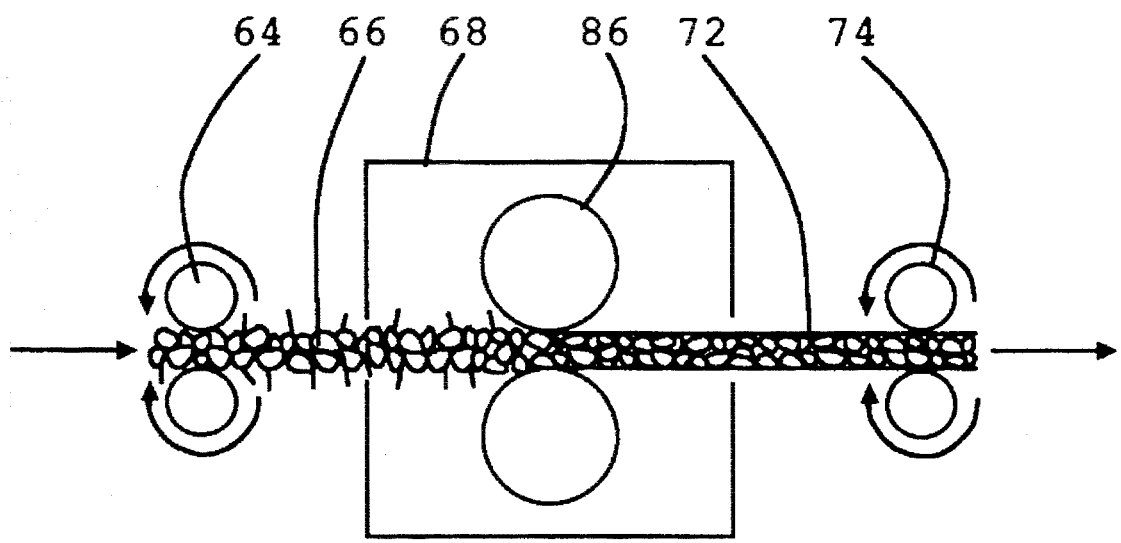
FIG. 2 is a view of an alternate means of heat treatment of the batt, involving the use of heated calendar rolls.

FIG. 2 shows an alternate means of heating the batt to form the skin. The rollers 64 guide the batt 66 into the heating chamber 68, which contains calendar rolls 86 whose surfaces are maintained at approximately 350 F. A skin forms as the batt 66 passes through the calendar rolls 86, and the batt emerges at 72 as it is pulled from the heating chamber 68 by take-up rollers 74. The disadvantage of the use of calendar rolls 86 is that it tends to compress the batt 66 as it is heated, leading to decreased loft (and insulation value) after the batt 72 cools.

Figure 3:
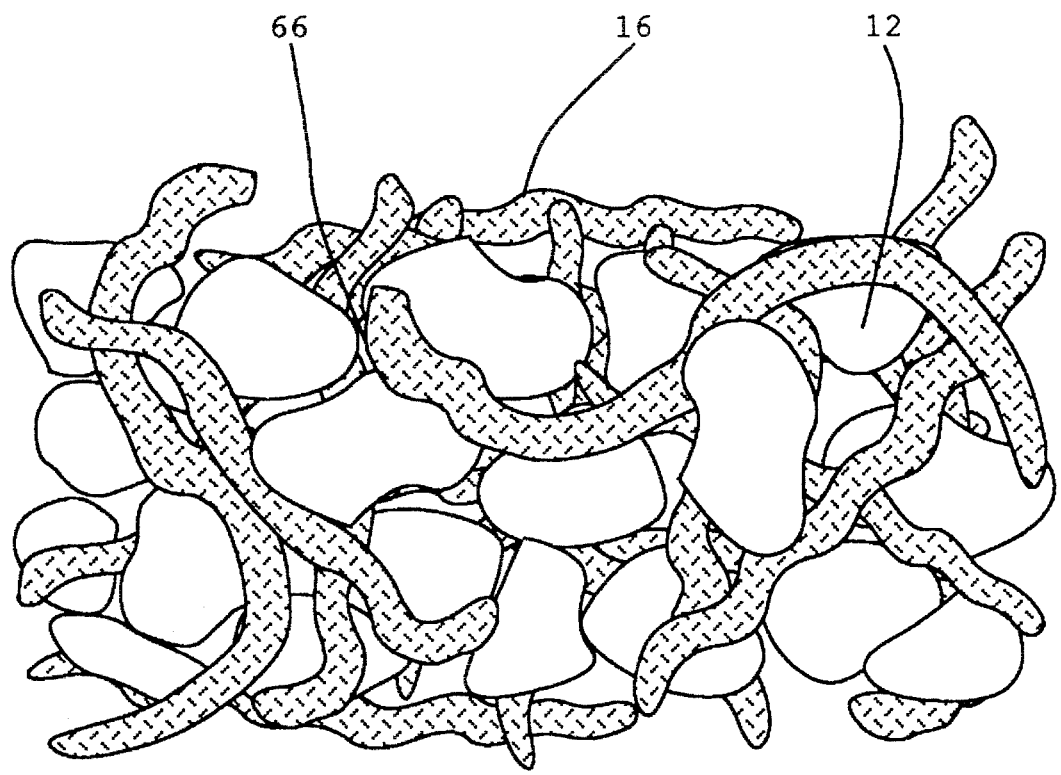
FIG. 3 is a view of the insulating batt before heat treatment.
Figure 4:
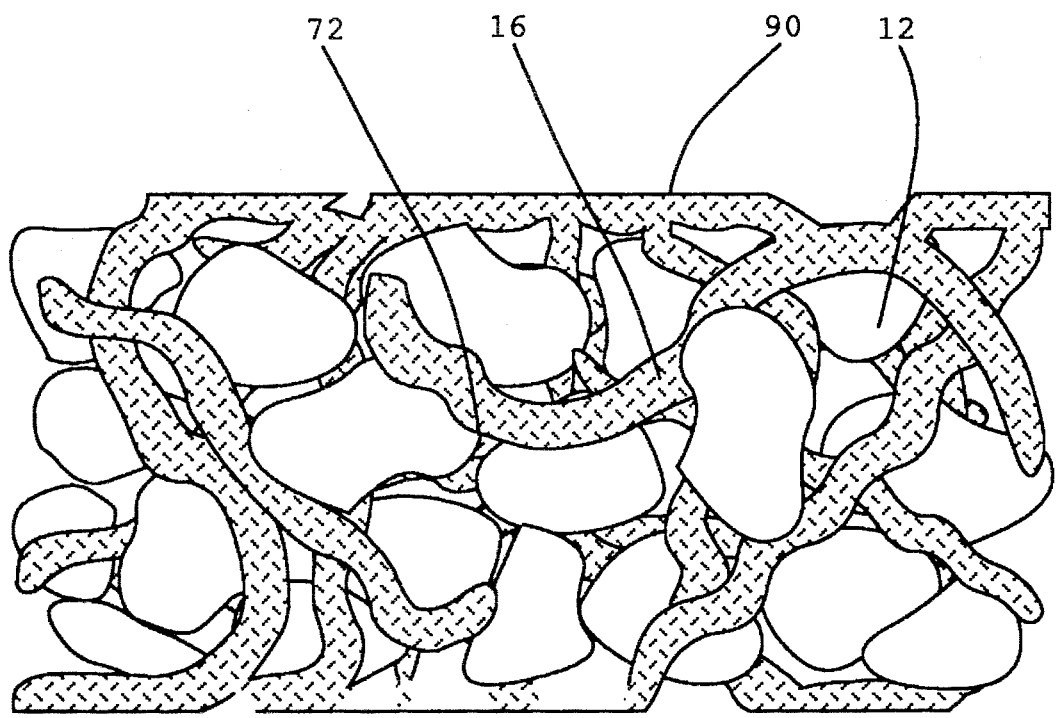
FIG. 4 is a view of the insulating batt after heat treatment.

FIGS. 3 and 4 are views of the height of the batt before and after heating. FIG. 3 shows the batt 66 before heat treatment; the cellulosic particulates 12 are dispersed throughout the entangled thermoplastic fibers 16. FIG. 4 shows the batt 72 after heat-treatment. The thermoplastic fibers 16 at the surface of the batt 72 have melted and fused, forming the skin 90. Some of the thermoplastic fibers 16 extend from one face of the batt 72 to the other. These fibers make it difficult for the skin 90 to peel from either face of the batt.

It is understood that the invention is not confined to the particular construction and arrangement of parts herein illustrated and described, but embraces such modified forms thereof as come within the scope of the following claims.

What is claimed is:

1. A method of making a resilient batt suitable for use as a thermal insulation, the method comprising the steps of:

mixing cellulosic particulates and thermoplastic fibers to form a mixture in which the cellulosic particulates are entangled by the thermoplastic fibers, wherein the cellulosic particulates include cellulosic particles and cellulosic fibers, the cellulosic particles being substantially 1–10 mm in diameter and the cellulosic fibers being substantially 0.5–3.0 mm in length and wherein the thermoplastic fibers are 3–15% of the mixture by weight, are 1–6 denier and are 2–15 cm in length; and forming an insulating batt from the mixture; and heat treating at least one surface of the batt to melt the thermoplastic fibers at the at least one surface of the batt without melting the thermoplastic fibers in the interior of the batt to form a heat treated batt having at least one skin wherein the thermoplastic fibers in the interior of the heat treated batt are unmelted and are joined to one another only by entanglement and wherein the batt is capable of being compressed, rolled-up and confined in rolled-up form and returning to its original shape upon removal of the confinement.

2. The method of claim 1, wherein at least one of the cellulosic particulates and thermoplastic fibers is fire resistant.

3. The method of claim 1 further including the step of treating the batt so that the batt is fire resistant.

4. The method of claim 1, wherein at least one of-the cellulosic particulates and thermoplastic fibers is vermin resistant.

5. The method of claim 1 further including the step of treating the batt so that the batt is vermin-resistant.

6. The method of claim 1, wherein the thermoplastic fibers are hollow.

7. The method of claim 1 further including the step of affixing a facing sheet to the heat treated batt.

8. The method of claim 7, wherein the facing sheet is kraft paper.

9. The method of claim 7, wherein the facing sheet is metallic foil.

10. The method of claim 7 wherein the step of affixing includes the steps of spraying an asphalt spray on a surface of said heat treated batt and placing said facing sheet on said asphalt.

11. The method of claim 1, wherein two surfaces of the batt are heat treated in the heat treating step and the two surfaces are heat treated using heated rolls.

* * * * *